(12) United States Patent
Uemura et al.

(10) Patent No.: US 12,220,654 B2
(45) Date of Patent: Feb. 11, 2025

(54) FILTER-ATTACHED CARTRIDGE

(71) Applicant: Enplas Corporation, Kawaguchi (JP)

(72) Inventors: Shigeru Uemura, Saitama (JP); Koji Noguchi, Saitama (JP)

(73) Assignee: Enplas Corporation, Saitama (JP)

( * ) Notice: Subject to any disclaimer, the term of this patent is extended or adjusted under 35 U.S.C. 154(b) by 588 days.

(21) Appl. No.: 17/299,326

(22) PCT Filed: Nov. 28, 2019

(86) PCT No.: PCT/JP2019/046563
§ 371 (c)(1),
(2) Date: Jun. 3, 2021

(87) PCT Pub. No.: WO2020/116309
PCT Pub. Date: Jun. 11, 2020

(65) Prior Publication Data
US 2022/0023777 A1    Jan. 27, 2022

(30) Foreign Application Priority Data
Dec. 3, 2018  (JP) .................................. 2018-226276

(51) Int. Cl.
*B01D 29/00*  (2006.01)
*B01D 29/01*  (2006.01)
*B01D 29/58*  (2006.01)
*B01D 39/16*  (2006.01)

(52) U.S. Cl.
CPC ....... *B01D 29/0095* (2013.01); *B01D 29/012* (2013.01); *B01D 29/58* (2013.01); *B01D 39/1692* (2013.01); *B01D 2201/29* (2013.01); *B01D 2221/10* (2013.01); *B01D 2239/10* (2013.01); *B01D 2239/1216* (2013.01)

(58) Field of Classification Search
None
See application file for complete search history.

(56) References Cited

U.S. PATENT DOCUMENTS 4,819,809 A * 4/1989 Derrick ................. B07B 1/4609
                                                              209/400
4,861,469 A * 8/1989 Rossi ..................... F02M 37/50
                                                              210/DIG. 6

(Continued)

FOREIGN PATENT DOCUMENTS

CN          201200932        3/2009
CN          106029329        10/2016

(Continued)

OTHER PUBLICATIONS

International Search Report and Written Opinion for International Application No. PCT/JP2019/046563 mailed on Feb. 4, 2020, 9 pages.

*Primary Examiner* — Robert J Popovics
(74) *Attorney, Agent, or Firm* — Amin, Turocy & Watson, LLP

(57) ABSTRACT

Provided is a filter-attached cartridge which is inexpensive and has high productivity. This filter-attached cartridge has: a first resin mesh which is an integrally molded body having a plurality of ribs arranged therein in a lattice shape; and a cylinder formed in a cylindrical shape so as to surround the first mesh.

9 Claims, 5 Drawing Sheets

(56) References Cited

U.S. PATENT DOCUMENTS

| | | | | |
|---|---|---|---|---|
| 4,882,055 | A * | 11/1989 | Stamstad | B01D 29/13 264/328.14 |
| 5,045,184 | A * | 9/1991 | Arkles | B07B 1/46 335/219 |
| 5,722,417 | A * | 3/1998 | Garbe | A61B 5/087 600/529 |
| 6,675,975 | B1 * | 1/2004 | Cook | B07B 1/4618 209/403 |
| 6,968,713 | B2 * | 11/2005 | Corrigan | F25B 43/003 62/474 |
| 8,951,413 | B2 * | 2/2015 | Lawson | E04H 4/1218 210/167.16 |
| 9,375,756 | B2 * | 6/2016 | Lipa | B07B 1/4681 |
| 2005/0198993 | A1 * | 9/2005 | Corrigan | B01D 53/261 62/474 |
| 2007/0227954 | A1 * | 10/2007 | Nogalski | B07B 1/46 209/404 |
| 2016/0199758 | A1 | 7/2016 | Suzuki | |
| 2016/0303495 | A1 | 10/2016 | Suzuki | |
| 2017/0056791 | A1 | 3/2017 | Suzuki | |
| 2018/0243672 | A1 | 8/2018 | Banju et al. | |
| 2022/0023777 | A1 * | 1/2022 | Uemura | B29C 45/14 |

FOREIGN PATENT DOCUMENTS

| | | |
|---|---|---|
| CN | 108025238 | 5/2018 |
| JP | 63-092642 | 6/1988 |
| JP | 08-229312 | 9/1996 |
| JP | 2015-061742 | 4/2015 |
| JP | 2015-155187 | 8/2015 |
| WO | 2018/042944 | 3/2018 |

\* cited by examiner

FILTER-ATTACHED CARTRIDGE

TECHNICAL FIELD

The present invention relates to a cartridge with at least one filter.

BACKGROUND ART

Filters have been used to remove foreign substances from fluids such as liquids and gases (see, for example, Patent Literature (hereinafter, referred to as "PTL") 1). In accordance with the size of foreign substances to be removed, a filter having holes with a size such that the foreign substances can be removed is selected. The filter can capture only foreign substances by allowing a fluid that contains the foreign substances to pass therethrough.

PTL 1 describes a filter including a non-woven fabric and a case made of a resin for holding the non-woven fabric. The case holds the non-woven fabric so that the non-woven fabric is sandwiched from the front and back directions. In the filter described in PTL 1, a part of the inside of the case is melted by ultrasonic waves to adhere the non-woven fabric to the inside of the case.

For efficiently removing fine foreign substances contained in a biological sample or the like, a filter with a large number of extremely small holes is required. A membrane filter is known as a filter with a large number of extremely small holes.

CITATION LIST

Patent Literature

PTL 1 Japanese Patent Application Laid-Open No. 8-229312

SUMMARY OF INVENTION

Technical Problem

As a membrane filter is thin, when such a membrane filter is held in the above described case, the membrane filter may not properly adhere to the case. As a result, the quality of products containing membrane filters tends to vary. In addition, products including membrane filters are expensive because of the complicated manufacturing process.

An object of present invention is to provide a cartridge with at least one filter at low cost with high productivity.

Solution to Problem

A cartridge with at least one filter according to the present invention includes a resin-made first mesh which is an integrally molded body and made of a resin, and in which a plurality of ribs are disposed in a grid pattern; and a cylinder formed in a cylindrical shape so as to surround the first mesh.

Advantageous Effects of Invention

The present invention can provide a cartridge with at least one filter at low cost with high productivity.

DESCRIPTION OF EMBODIMENTS

Hereinafter, one or more embodiments of the present invention will be described in detail with reference to the drawings.

Embodiment 1

Configuration of Cartridge with at Least One Filter

Figure 1A:
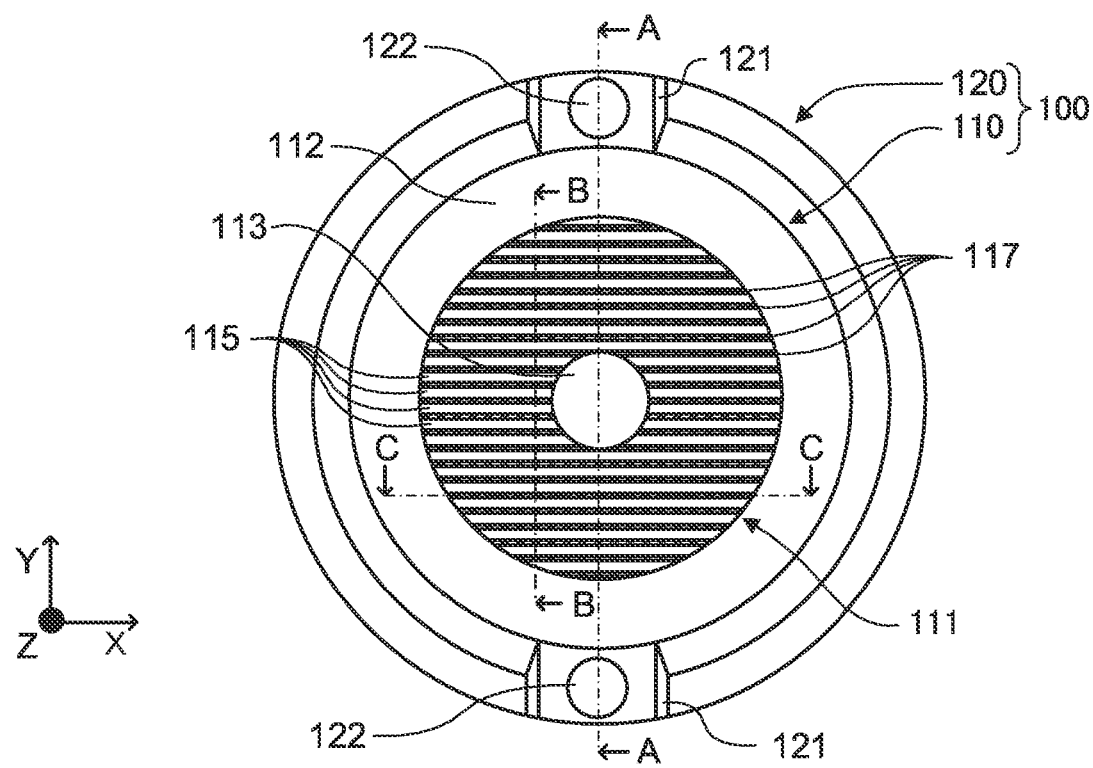
FIGS. 1A and 1B illustrate the configuration of a cartridge with at least one filter according to embodiment 1 of the present invention.
Figure 1B:
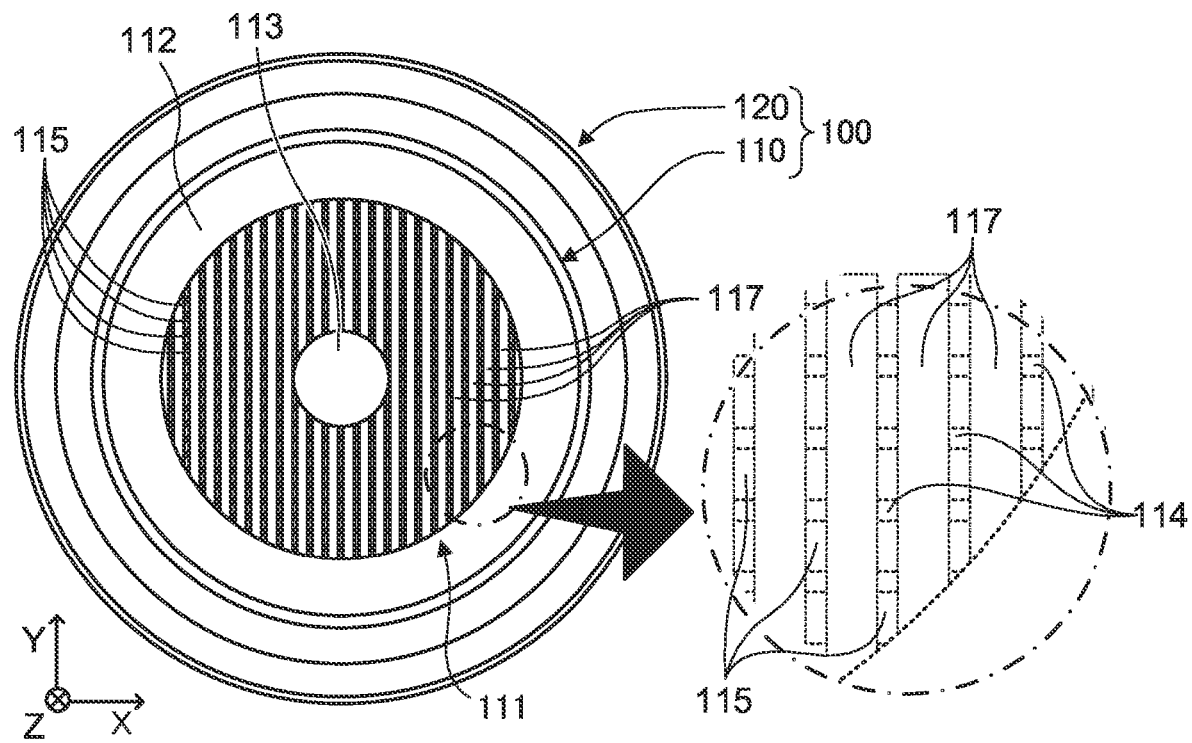
Figure 2:
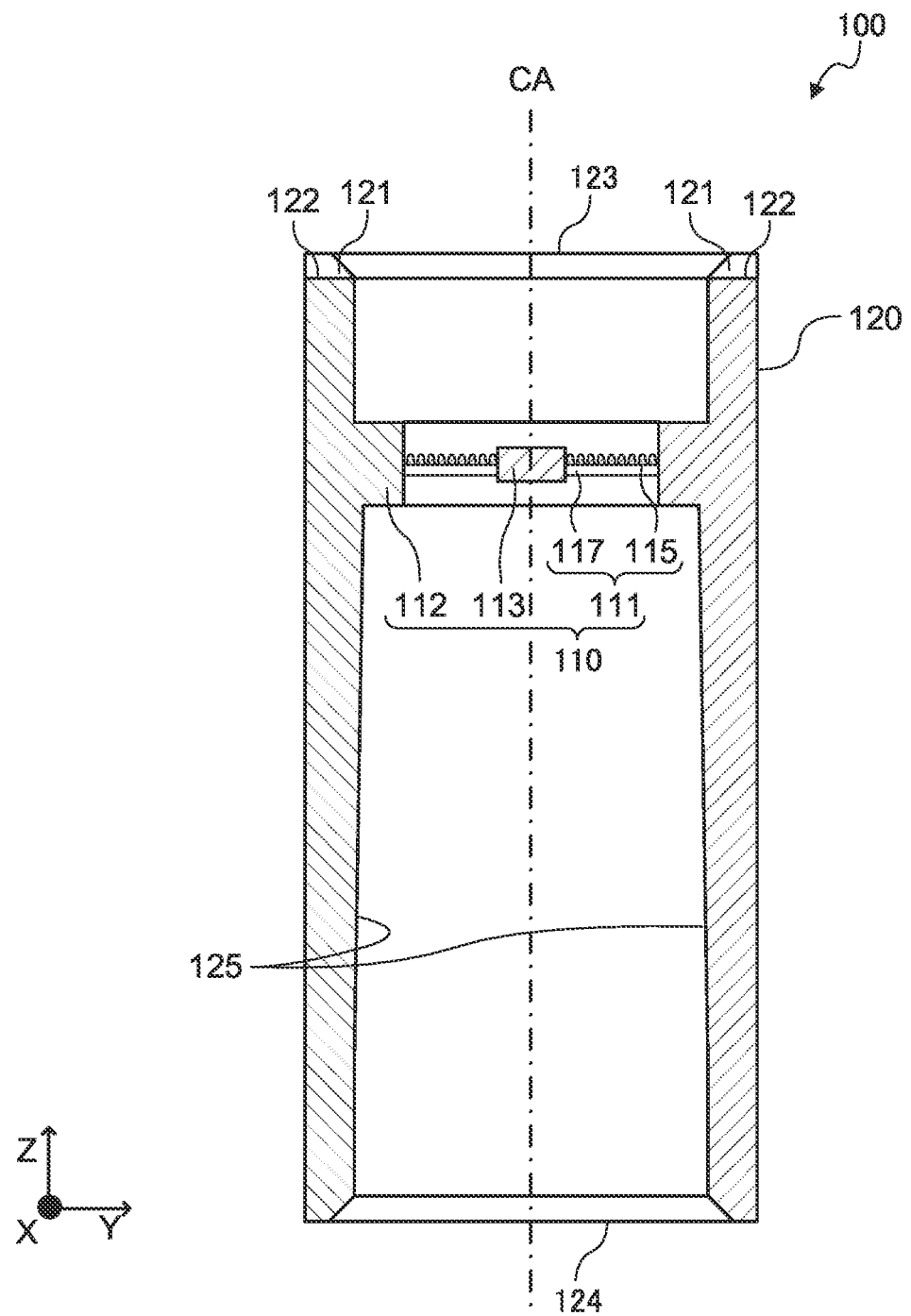
FIG. 2 is a cross-sectional view of the cartridge with at least one filter according to embodiment 1 of the present invention.
Figure 3A:
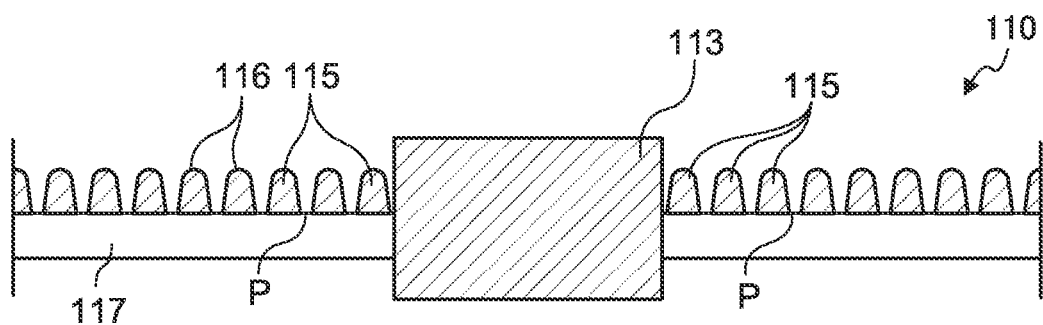
FIGS. 3A to 3C are partially enlarged cross-sectional views of a mesh.
Figure 3B:
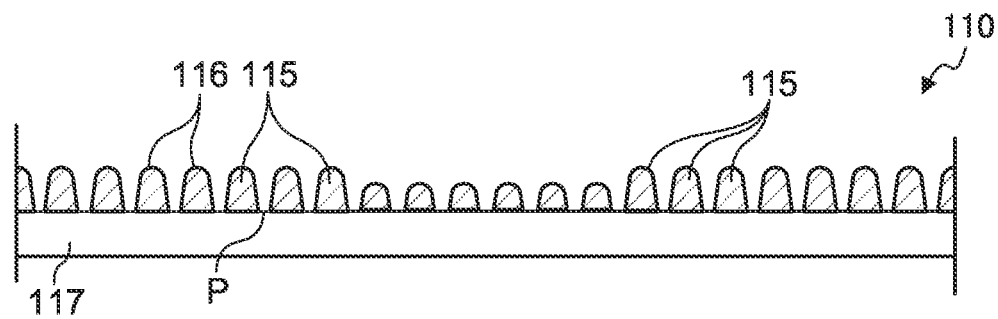
Figure 3C:
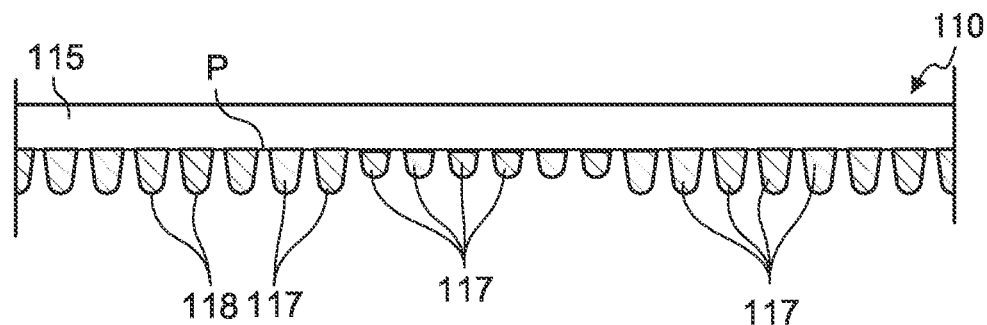
Figure 4A:
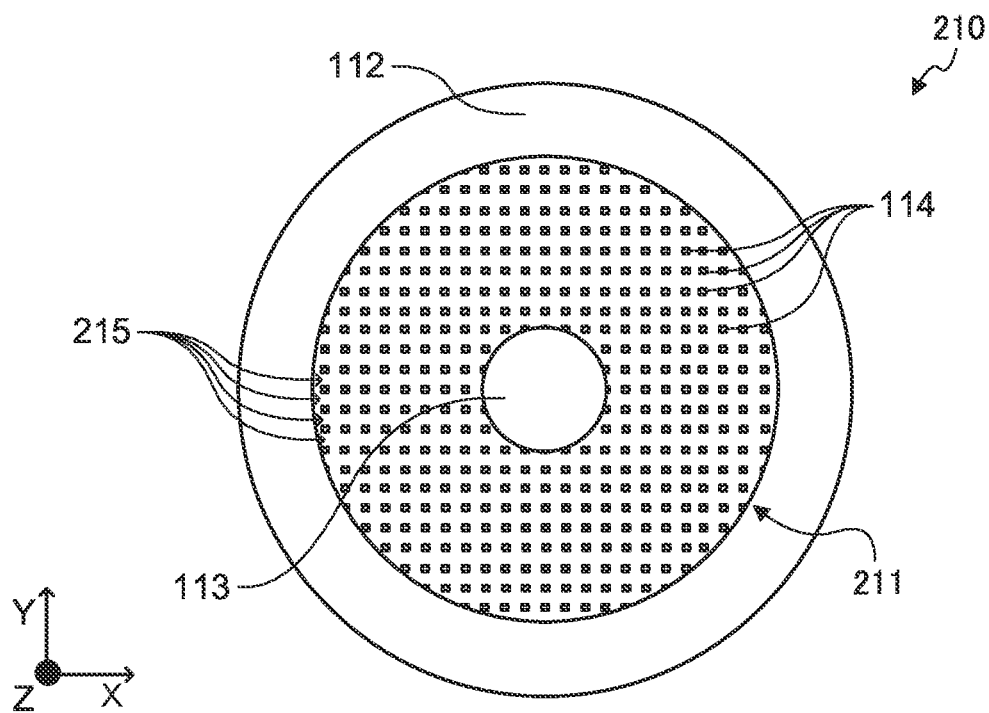
FIGS. 4A and 4B illustrate the configuration of a mesh in a cartridge with at least one filter according to a modification of embodiment 1 of the present invention.
Figure 4B:
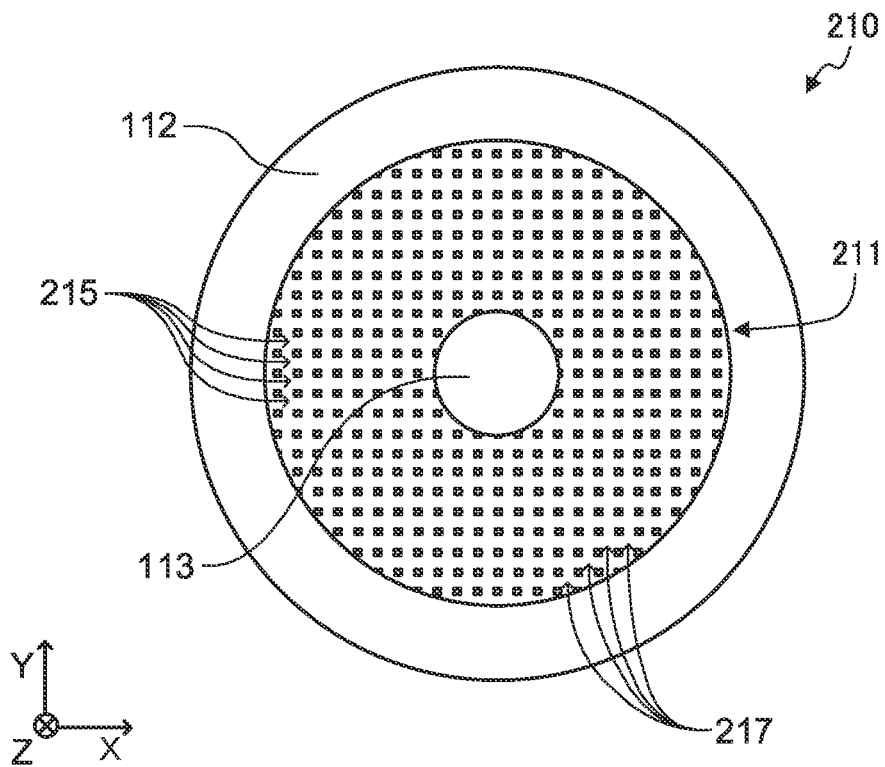

FIGS. 1A and 1B, FIG. 2, and FIG. 3A to 3C illustrate the configuration of cartridge 100 with at least one filter according to embodiment 1 of the present invention. FIG. 1A is a plan view of cartridge 100 with at least one filter, and FIG. 1B is a bottom view of cartridge 100 with at least one filter. FIG. 2 is a cross-sectional view taken along line A-A of FIG. 1A. FIG. 3A is a partially enlarged cross-sectional view taken along line A-A of FIG. 1A, FIG. 3B is a partially enlarged cross-sectional view taken along line B-B of FIG. 1A, and FIG. 3C is a partially enlarged cross-sectional view taken along line C-C of FIG. 1A. In the following description, a direction in which first rib 115 extends is defined as the first direction (X direction), a direction which is orthogonal to the first direction (X direction), and in which second rib 117 extends, is defined as the second direction (Y direction), and the height (thickness) direction of first rib 115 and second rib 117, which is orthogonal to the first direction (X direction) and the second direction (Y direction), is defined as the third direction (Z direction).

As illustrated in FIGS. 1A and 1B, FIG. 2, and FIG. 3A to 3C, cartridge 100 with at least one filter includes mesh 110 and cylinder 120.

The material of cartridge 100 with at least one filter is a resin such as polypropylene (PP), polycarbonate (PC), cycloolefin polymer (COP), polyacetal (POM), or polyamide (PA). Cartridge 100 with at least one filter can be manufactured by, for example, an injection molding method. Mesh 110 and cylinder 120 may be integrally molded, or mesh 110 and cylinder 120 may be separately molded. In the present embodiment, mesh 110 and cylinder 120 are integrally molded.

Mesh 110 captures foreign substances contained in a fluid such as a gas or a liquid by allowing the fluid to pass therethrough. Mesh 110 includes mesh portion 111, rim portion 112, and final filling portion 113. Mesh 110 is made of a resin such as polypropylene (PP), polycarbonate (PC), cycloolefin polymer (COP), polyacetal (POM), or polyamide (PA), and is an integrally molded body.

Mesh portion 111 may have any shape in plan view. In the present embodiment, mesh portion 111 has a circular shape in plan view. Plurality of holes (openings) 114 are formed in mesh portion 111. Plurality of holes (openings) 114 are open in the direction along central axis CA of cylinder 120. Plurality of holes 114 in mesh portion 111 may have any shape in plan view. The shape of hole 114 in plan view may be a circle or a polygon. In the present embodiment, mesh portion 111 includes plurality of first ribs 115 and a plurality of second ribs 117. Plurality of first ribs 115 and plurality of second ribs 117 form a plurality of holes 114 having a square shape in plan view. The sides of hole 114 may have any length. The length of one side of hole 114 (mesh opening of mesh 110) is, for example, 10 to 500 μm. The number of holes 114 may be any number. For example, the number of holes 114 is 1 to 400 per $mm^2$.

First rib 115 is a protrusion whose first ridge line 116 extends in the first direction (X direction). Plurality of first ribs 115 are disposed parallel to each other and at equal intervals in the second direction (Y direction) orthogonal to the first direction (X direction). In the present embodiment, plurality of first ribs 115 are disposed on the first surface (front surface) of virtual plane P. The cross section (YZ cross section), orthogonal to the extending direction (X direction), of first rib 115 may have any shape. In the present embodiment, the cross section is substantially in a shape of a triangle where one top including first ridge line 116 has a shape of an arc (see FIGS. 3A and 3B).

As described below, final filling portion 113 is disposed in the central part of mesh portion 111 (see FIGS. 1A and 1B). That is, regarding first rib 115 passing through the central part of mesh portion 111, one end of first rib 115 is connected to the inner side surface of rim portion 112 and the other end is connected to the side surface of final filling portion 113. Regarding first rib 115 not passing through the central portion of mesh 110, both ends of first rib 115 are connected to the inner side surface of rim portion 112.

Second rib 117 is a protrusion whose second ridge line 118 extends in the second direction (Y direction). Plurality of second ribs 117 are disposed parallel to each other and at equal intervals in the first direction (X direction). In the present embodiment, plurality of second ribs 117 are disposed on the second surface (back surface) of virtual plane P. The cross section (XZ cross section), orthogonal to the extending direction (Y direction), of second rib 117 may have any shape. In the present embodiment, the cross section is substantially in a shape of a triangle where one top including second ridge line 118 has a shape of an arc (see FIG. 3C).

As with first ribs 115, regarding second rib 117 passing through the central part of mesh portion 111, one end of second rib 117 is connected to the inner side surface of rim portion 112 and the other end is connected to the side surface of final filling portion 113. Regarding second rib 117 not passing through the central part of mesh portion 111, both ends of second rib 117 are connected to the inner side surface of rim portion 112.

Plurality of first ribs 115 and plurality of second ribs 117 are disposed in a front-to-back relationship with virtual plane P as a boundary. That is, plurality of first ribs 115 and plurality of second ribs 117 are disposed in such a way that the positions of plurality of first ribs 115 differ from the positions of plurality of second ribs 117 in the height direction (Z direction) of the ribs. When mesh 110 is viewed in plan view from the top, plurality of second ribs 117 are disposed behind first ribs 115 and at equal intervals in the first direction (X direction). Further, when mesh 110 is viewed in plan view from the bottom, plurality of first ribs 115 are disposed behind second ribs 117 and at equal intervals in the second direction (Y direction).

Rim portion 112 holds mesh portion 111. Rim portion 112 is disposed so as to surround mesh portion 111. Rim portion 112 may have any shape in plan view. In the present embodiment, rim portion 112 has an annular shape in plan view. Plurality of first ribs 115 and plurality of second ribs 117 are connected to the inner side surface of rim portion 112. In the third direction (Z direction), rim portion 112 may be formed thicker than mesh portion 111, to have the same thickness as mesh portion 111, or thinner than mesh portion 111. In the present embodiment, rim portion 112 is formed thicker than mesh portion 111 in the third direction (Z direction).

Final filling portion 113 is disposed at mesh portion 111 inside rim portion 112. In the present embodiment, final filling portion 113 is disposed at the central part of mesh portion 111. Mesh portion 111 surrounds final filling portion 113. Final filling portion 113 is a last part to be filled with a molten resin during injection molding, functions as a degassing portion during filling of a cavity with the molten resin, and may function as a part where an ejector pin comes into contact during releasing of an injection molded body. The ejector pin may come into contact from the front surface side of final filling portion 113, or from the back surface side of final filling portion 113. Final filling portion 113 may have any shape as long as the above functions are exhibited. In the present embodiment, final filling portion 113 has a shape of a column. One or more first ribs 115 among plurality of first ribs 115 and one or more second ribs 117 among plurality of second ribs 117 are connected to the side surface of final filling portion 113.

In cartridge 100 with at least one filter according to the present embodiment, the cross-sectional area of at least one of the ribs connected to final filling 113 is smaller than the cross-sectional area of at least one of the ribs not connected to final filling 113. Herein, the "cross-sectional area of a rib" means the area of the cross section of the rib in the direction perpendicular to the extending direction of the rib. In the example illustrated in FIGS. 1A, 1B and 3A to 3C, all the cross-sectional areas of first ribs 115 and second ribs 117 connected to final filling portion 113 are the same. All the cross-sectional areas of first ribs 115 and second ribs 117 not connected to final filling portion 113 are also the same. As illustrated in FIGS. 3B and 3C, the cross-sectional areas of first ribs 115 and second ribs 117 connected to final filling portion 113 are smaller than the cross-sectional areas of first ribs 115 and second ribs 117 not connected to final filling portion 113. (Herein "a first rib and a second rib connected to a final filling portion" means "a first rib connected to a final filling portion and a second rib connected to the final filling portion," and "a first rib and a second rib not connected to a final filling portion" means "a first rib not connected to a final filling portion and a second rib not connected to the final filling portion.")

Cylinder 120 holds mesh 110. In the present embodiment, cylinder 120 is made of a resin such as polypropylene (PP), polyacetal (POM), or polyamide (PA), and is an integrally molded body. Cylinder 120 may have any shape as long as cylinder 120 can hold mesh 110. In the present embodiment, cylinder 120 has a shape of a cylinder with a substantially circular cross section. At one end of cylinder 120, pair of notched portions 121 and 121 are formed. Pair of notched portions 121 and 121 are disposed at the one end of cylinder 120 so as to be evenly spaced in the circumferential direction of the cylinder. Gate marks 122 are formed at pair of notched portions 121 and 121, respectively. First opening 123 at the one end of cylinder 120 and second opening 124 at the other end of cylinder 120 may have any shape. The shape of first opening 123 and the shape of second opening 124 may be the same or different. In the present embodiment, first opening 123 and second opening 124 both have a circular shape. The opening edge of first opening 123 and the opening edge of second opening 124 are each formed in a tapered shape. Mesh 110 is connected to inner side surface 125 of cylinder 120. Mesh 110 may be at any position in the direction connecting first opening 123 and second opening 124 (direction along central axis CA) in cylinder 120. This position is appropriately set according to the application of cartridge 100 with at least one filter.

Modification

A cartridge with at least one filter according to the modification of embodiment 1 differs from cartridge 100 with at least one filter according to embodiment 1 only in the configuration of mesh 210. Only mesh 210 thus will be described, and the same reference numerals are given to the configurations same as those of mesh 110 according to embodiment 1 and the descriptions thereof will be omitted.

Mesh 210 of the cartridge with at least one filter according to the present modification includes mesh portion 211, rim portion 112, and final filling portion 113. In the cartridge with at least one filter according to the modification, plurality of first ribs 215 and plurality of second ribs 217 are disposed at the same position in the height direction (Z direction) of the ribs. That is, plurality of first ribs 215 and plurality of second ribs 217 are disposed such that first ribs 215 intersect with second ribs 217 in mesh 210 in the cartridge with at least one filter according to the present modification.

Effects

As described above, cartridge 100 with at least one filter according to the present embodiment includes integrally molded resin-made mesh 110 or 210 and cylinder 120, and thus cartridge 100 with at least one filter can be manufactured at low cost with a high yield.

Figure 5A:
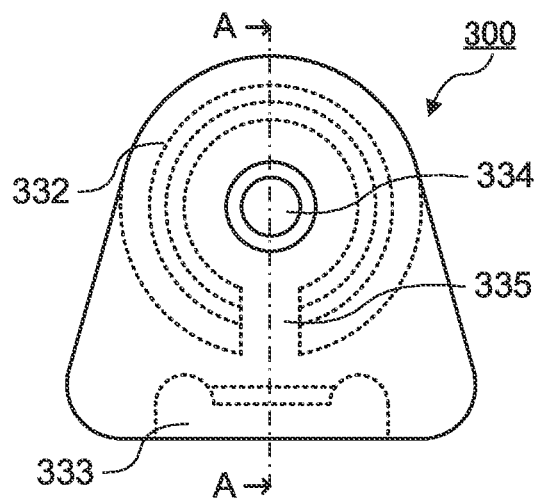
FIGS. 5A to 5C illustrate the configuration of a cartridge with at least one filter according to embodiment 2.
Figure 5B:
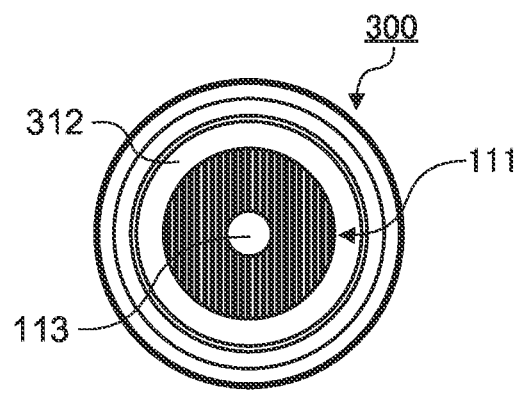
Figure 5C:
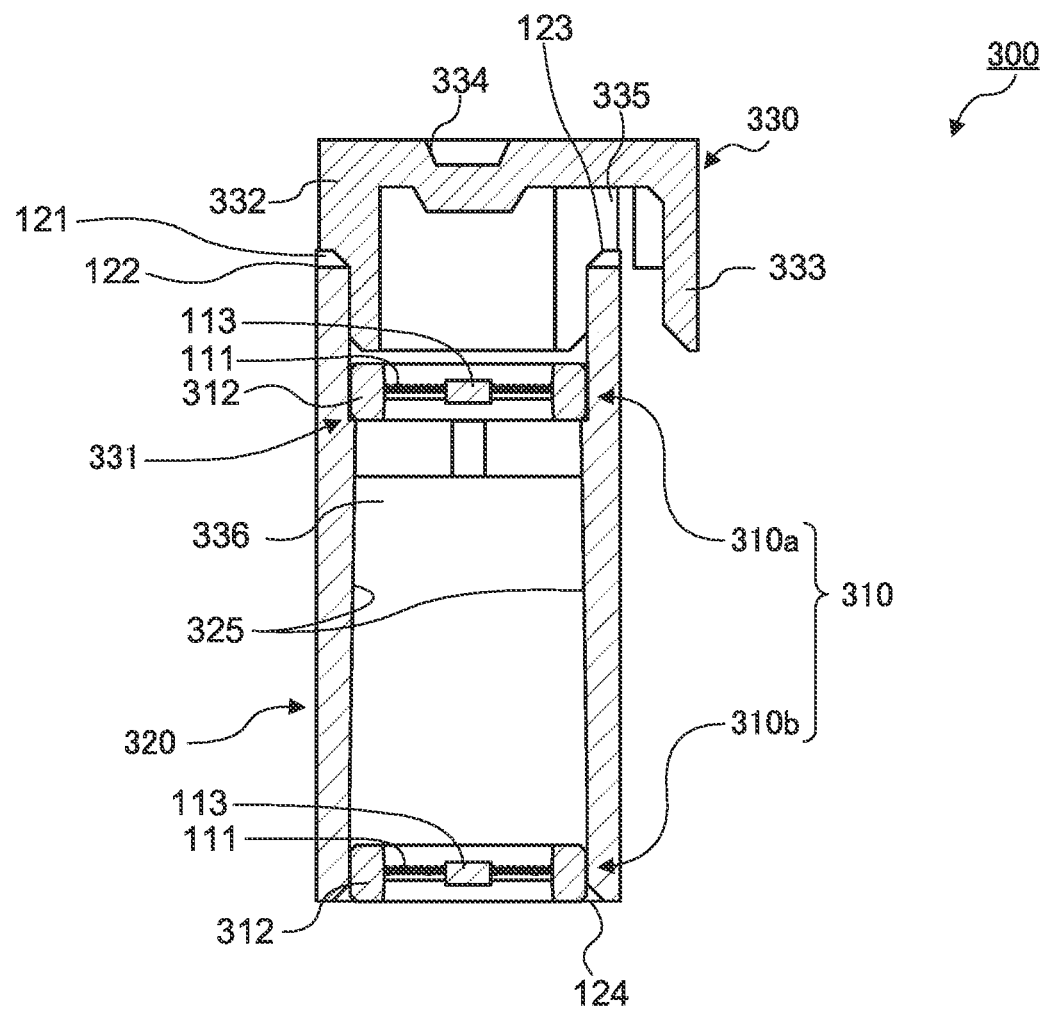

In the following, cartridge 300 with at least one filter according to embodiment 2 will be described. FIGS. 5A to 5C illustrate the configuration of cartridge 300 with at least one filter according to embodiment 2. FIG. 5A is a plan view of cartridge 300 with at least one filter according to embodiment 2, FIG. 5B is a bottom view of the cartridge with at least one filter, FIG. 5C is a cross-sectional view taken along line A-A of FIG. 5A.

Cartridge 300 with at least one filter according to embodiment 2 includes at least one mesh 310, cylinder 320, and cap 330. In the present embodiment, mesh 310 and cylinder 320 are separately molded.

The number of meshes 310 may be any number. In the present embodiment, at least one mesh 310 include first mesh 310a and second mesh 310b. First mesh 310a includes mesh portion 111, rim portion 312, and final filling portion 113. Second mesh 310b includes mesh portion 111, rim portion 312, and final filling portion 113. First mesh 310a and second mesh 310b are the same as mesh 110 in embodiment 1 except that they are formed separately from cylinder 320, and thus the description thereof will be omitted.

Cylinder 320 holds mesh 310. Cylinder 320 may have any shape as long as cylinder 320 can hold mesh 310. In the present embodiment, cylinder 320 has a shape of a cylinder with a substantially circular cross section.

At one end of cylinder 320, pair of notched portions 121 and 121 are formed. Pair of notched portions 121 and 121 are disposed at the one end of the cylinder so as to be evenly spaced in the circumferential direction of the cylinder. Gate marks 122 are formed at pair of notched portions 121 and 121, respectively. First opening 123 at the one end of cylinder 320 and second opening 124 at the other end of cylinder 320 may have any shape. The shape of first opening 123 and the shape of second opening 124 may be the same or different. In the present embodiment, first opening 123 and second opening 124 both have a circular shape. The opening edge of first opening 123 and the opening edge of second opening 124 are each formed in a tapered shape. Step portion 331 is disposed on inner side surface 325 of cylinder 320.

Step portion 331 may have any shape. In the present embodiment, step portion 331 is disposed on inner side surface 325 of cylinder 320. Step portion 331 holds first mesh 310a from the other end side and the side surface side. Step portion 331 may be at any position in the direction connecting first opening 123 and second opening 124 in cylinder 320. This position is appropriately set according to the application of cartridge 300 with at least one filter.

Cap 330 prevents first mesh 310a from coming out of cylinder 320 from the one end side. Cap 330 is to be disposed at one end of cylinder 320. Cap 330 includes cap body 332 and outer wall portion 333. Cap body 332 is formed in such a way that cap body 432 is to engage with the inner peripheral surface of cylinder 320. Recess 334 is formed in the top surface of cap body 332. In addition, communication portion 335 that communicates with the outside is formed in cap body 332. Communication portion 335 functions, for example, as a channel for a liquid, such as a sample passing through first mesh 310a via below-described reagent storage portion 336, from the inside of cap 330 to the outside in the radial direction. Outer side wall portion 333 changes the flow direction of the liquid, which has passed through communication portion 335, toward the lower side in FIG. 5C along the outer wall of cylinder 320.

In the present embodiment, first mesh 310a is placed into cylinder 320 from one end of cylinder 320 so as to come into contact with step portion 331. Cap 330 is then placed by inserting cap 330 from the one end side of cylinder 320. By press fitting second mesh 310b into the other end of cylinder 320, second mesh 310b is placed into cylinder 320.

The space between first mesh 310a and second mesh 310b can function as, for example, reagent storage portion 336. In such a case, cartridge 300 with at least one filter according to the present embodiment can also be used for a predetermined reaction using a biological sample or the like. For example, a biological sample is injected from the one end side or the other end side of cylinder 320 with a solid reagent previously placed in reagent storage portion 336. When the biological sample is injected from the other end side, the biological sample passes through second mesh 310b and flows into reagent storage portion 336. The biological sample flowing into reagent storage portion 336 reacts with the reagent previously stored in reagent storage portion 336. First mesh 310a retains a solid reagent, a solid carrier for capturing an object, and the like in reagent storage portion 336.

Effects

Cartridge 300 with at least one filter according to the present embodiment provides substantially the same effects as that of cartridge 100 with at least one filter according to embodiment 1.

All the cross-sectional areas of first ribs 115, 215 (second ribs 117, 217) connected to final filling portion 113 are the same, and all the cross-sectional areas of first ribs 115, 215 (second ribs 117, 217) not connected to final filling portion 113 are the same in the above embodiments. However, the cross-sectional areas of first ribs 115, 215 (second ribs 117, 217) connected to final filling portion 113 may be different from each other, and the cross-sectional areas of first ribs 115, 215 (second ribs 117, 217) not connected to final filling portion 113 may also be different from each other.

This application claims priority based on Japanese Patent Application No. 2018-226276, filed on Dec. 3, 2018, the entire contents of which including the specification and the drawings are incorporated herein by reference.

INDUSTRIAL APPLICABILITY

The cartridges with at least one filter according to the present invention are advantageous for removing foreign substances from fluids such as liquids and gases. The cartridges with at least one filter according to the present invention include a finer mesh filter than conventional mesh filters, and thus particularly advantageous for removing foreign substances in biological samples.

REFERENCE SIGNS LIST 100, 300 Cartridge with at least one filter
110, 210, 310 Mesh
111, 211 Mesh portion
112, 312 Rim portion
113 Final filling portion
114 Hole (opening)
115, 215 First rib
116 First ridge line
117, 217 Second rib
118 Second ridge line
120, 320 Cylinder
121 Notched portion
122 Gate mark
123 First opening
124 Second opening
125, 325 Inner side surface
310a First mesh
310b Second mesh
330 Cap
331 Step portion
332 Cap body
333 Outer side wall portion
334 Recess
335 Communication portion
336 Reagent storage portion
CA Central axis
P Virtual plane

What is claimed is:
1. An integrally molded cartridge, comprising:
   a cylindrically shaped body with a substantially circular cross section defining a circular interior surface, and being open at both ends;
   a first resin mesh having a virtual plane and including:
      a first plurality of ribs extending from a first side of the virtual plane and spanning a cross-section of the cylindrically shaped body and being integrally molded therewith; and
      a second plurality of ribs extending from a second side of the virtual plane and spanning the cross-section of the cylindrically shaped body and being integrally molded therewith, the second plurality of ribs, being orthogonally oriented with respect to the first plurality of ribs and being integrally molded therewith;
   wherein the orthogonally oriented first and second plurality of ribs define a grid of the first resin mesh having openings which are open in the direction along central axis of the cylindrically shaped body and sized to capture foreign substances above a predetermined size which are present in a fluid passing through the cylindrically shaped body.
2. The integrally molded cartridge of claim 1, wherein, a dimension of the openings of the first resin mesh ranges from 10 to 500 microns.
3. The integrally molded cartridge of claim 1, wherein, the openings of the first resin mesh have a square shape.
4. The integrally molded cartridge of claim 1, wherein, the openings of the first resin mesh range in number from 1 to 400 per square millimeter.
5. The integrally molded cartridge of claim 1, further comprising:
   a final filling portion disposed in a central part of the first resin mesh.
6. The integrally molded cartridge of claim 1, further comprising:
   a rim portion extending radially, inwardly from the circular interior surface.
7. The integrally molded cartridge of claim 1, wherein, individual ribs of the first plurality of ribs and/or the second plurality of ribs extend from the virtual plane in dimensions along the central axis that vary.
8. The integrally molded cartridge of claim 1, wherein, individual ribs of the first plurality of ribs and/or the second plurality of ribs extend from the virtual plane in dimensions along the central axis that are uniform.
9. The integrally molded cartridge of claim 1, wherein, the resin material is one of: polypropylene, polycarbonate, cycloolefin polymer, polyacetal, or polyamide.

* * * * *